(12) United States Patent
Tzeng (10) Patent No.: US 12,055,237 B2
(45) Date of Patent: Aug. 6, 2024

(54) SENSOR-OPERATED KITCHEN FAUCET (71) Applicant: Ncip Inc., Taipei (TW)

(72) Inventor: Rong-Chyan Tzeng, Taipei (TW)

(73) Assignee: NCIP INC., Taipei (TW)

( * ) Notice: Subject to any disclaimer, the term of this patent is extended or adjusted under 35 U.S.C. 154(b) by 274 days.

(21) Appl. No.: 17/579,992

(22) Filed: Jan. 20, 2022

(65) Prior Publication Data

US 2023/0228346 A1 Jul. 20, 2023

(51) Int. Cl.
*E03C 1/04* (2006.01)
*F16K 47/02* (2006.01)
*G05D 16/00* (2006.01)

(52) U.S. Cl.
CPC .............. *F16K 47/023* (2013.01); *E03C 1/04* (2013.01); *G05D 16/024* (2019.01)

(58) Field of Classification Search
CPC .......... E03C 1/04; E03C 1/057; F16K 47/023; G05D 16/024
USPC ............................................................ 4/676
See application file for complete search history.

(56) References Cited

U.S. PATENT DOCUMENTS

| | | |
|---|---|---|
| 5,826,611 A | 10/1998 | Ko |
| 6,012,476 A | 1/2000 | Ko |
| 9,637,895 B2 * | 5/2017 | Song ...................... E03C 1/0404 |
| 2015/0292187 A1 * | 10/2015 | Tseng ..................... E03C 1/0412 4/677 |
| 2015/0368888 A1 * | 12/2015 | Song ...................... E03C 1/0404 137/78.1 |
| 2019/0323621 A1 * | 10/2019 | Chen ........................ F16K 27/12 |
| 2020/0308814 A1 * | 10/2020 | Chen ........................ F16K 31/02 |
| 2020/0340599 A1 | 10/2020 | Tsai |
| 2021/0199208 A1 | 7/2021 | Huang et al. |
| 2022/0136224 A1 * | 5/2022 | Yan .......................... E03C 1/057 4/623 |
| 2022/0325817 A1 * | 10/2022 | Yang ......................... E03C 1/04 |

* cited by examiner

*Primary Examiner* — Huyen D Le
(74) *Attorney, Agent, or Firm* — MUNCY, GEISSLER, OLDS & LOWE, P.C.

(57) ABSTRACT

A sensor-operated kitchen faucet comprises a base, a mixing valve, a control assembly and a spout. The base extends vertically to define an inner space. The mixing valve is disposed in the inner space and communicated to a cold source and a hot source to supply a combined fluid. The control assembly comprises a inlet conduit, a outlet conduit, a cushioning member, a solenoid valve and a sensor. The inlet conduit is connected to the mixing valve to receive the combined fluid, the cushioning member comprises an outer tubing and an inner tubing, and the solenoid valve is electrically connected to the sensor and movably disposed at a connecting port communicated between the outer tubing the inner tubing. The spout is fluidly connected to the outlet conduit of the control assembly through a connecting conduit to supply the combined fluid.

7 Claims, 8 Drawing Sheets

SENSOR-OPERATED KITCHEN FAUCET

FIELD OF THE INVENTION

The invention is related to faucet, and more particularly to a sensor-operated kitchen faucet capable of improving water pressure.

BACKGROUND OF THE INVENTION

Faucet is a common cleaning equipment for installing in toilet, bathroom and kitchen for daily use. In order to improve the comfort level of users during washing, many household faucets are equipped with functions such as controlling the temperature of the water and sensing for flowing out the water, so that users can wash comfortably and conveniently, and strong or weak water pressure is also one of the important factors that affect the experience of use. The conventional mechanical faucet determines the water output volume mainly according to adjustment of the angle valve, and the conventional sensor-operated (or non-contact/smart type) faucet determines the water output volume according to actuation of the solenoid valve. Due to the height of building and other factors (for example, the water pressures of hot and cold water sources are different, pressure difference will be caused when mixing), the pressure of water flow in the faucet is unbalanced. The imbalance of pressure can cause water hammer vibration or the problem that the solenoid valve cannot be opened or closed smoothly. And for the conventional sensor-operated faucet, the only modes of water outlet are on and off, unlike the conventional mechanical faucet, the flow rate or pressure of water outlet can be adjusted between opening and closing. Therefore, the conventional sensor-operated faucet often causes water hammer due to unstable water outlet pressure, resulting in inconvenience in use. As for the conventional water pressure adjustment structures of faucets, such as in U.S. Pat. Nos. 5,826,611 A, 6,012,476 A, US2020/0340599A1, and US2021/0199208A1, the structures are rather complicated in the prior art, which not only increase the assembly costs, but also cause difficulties in future maintenance.

SUMMARY OF THE INVENTION

An object of the invention is to solve the problem of water hammer vibration or the solenoid valve cannot be opened or closed smoothly caused by the imbalance of pressure in the conventional sensor-operated faucets.

In order to achieve the above object, the invention provides a sensor-operated kitchen faucet comprising a base, a mixing valve, a control assembly and a spout, and the base extends vertically to define an inner space. The mixing valve is disposed in the inner space and connected to a cold source and a hot source to supply a combined fluid, and the mixing valve is operably coupled to an adjustment handle. The control assembly comprises a inlet conduit, a outlet conduit, a cushioning member, a solenoid valve and a sensor, the inlet conduit is connected to the mixing valve to receive the combined fluid, and the inlet conduit and the outlet conduit are configured at an interval along a first direction. The cushioning member is disposed between the inlet conduit and the outlet conduit, the cushioning member comprises an outer tubing and an inner tubing, and the outer tubing and the inner tubing are configured to dispose concentrically and extend along a second direction. The outer tubing and the inner tubing are respectively radially communicated to the inlet conduit and the outlet conduit. The solenoid valve is electrically connected to the sensor and movably disposed at a connecting port communicated between the outer tubing and the inner tubing. The spout is fluidly connected to the outlet conduit of the control assembly through a connecting pipeline to supply the combined fluid. In order to achieve the above object, the invention further provides a sensor-operated kitchen faucet comprising a base, a mixing valve, a control assembly and a spout, and the base extends vertically to define an inner space. The mixing valve is disposed in the inner space and connected to a cold source and a hot source to supply a combined fluid, and the mixing valve is operably coupled to an adjustment handle. The control assembly comprises a cushioning member, a solenoid valve and a sensor, the cushioning member comprises a body, an inlet opening, an outlet opening, and a cushioning conduit communicated between the inlet opening and the outlet opening, the inlet opening, the water outlet opening and the cushioning conduit are formed in the body, the inlet opening is communicated to the mixing valve to receive the combined fluid, the cushioning conduit comprises a hollow passage and an annular passage surrounding the hollow passage, the solenoid valve is electrically connected to the sensor and movably disposed at a connecting port communicated between the hollow passage and the annular passage. Wherein, the inlet opening, the cushioning conduit, and the outlet opening are configured to extend along a first direction, a second direction, and a third direction, respectively, wherein an angle between the first direction and the second direction is set in an range of 75 degrees and 90 degrees, an angle between the first direction and the third direction is set in an range less than 15 degrees, and an angle between the second direction and the third direction is set in an range of 75 degrees and 90 degrees. The spout is fluidly connected to the outlet conduit of the control assembly through a connecting conduit to supply the combined fluid.

In order to achieve the above object, the invention further provides a sensor-operated kitchen faucet comprising a base, a mixing valve, a control assembly and a spout, and the base extends vertically to define an inner space. The mixing valve is disposed in the inner space and connected to a cold source and a hot source to supply a combined fluid, and the mixing valve is operably coupled to an adjustment handle. The control assembly comprises a cushioning member, a solenoid valve and a sensor, the cushioning member comprises a body, an inlet opening, an outlet opening, and a cushioning conduit communicated between the inlet opening and the outlet opening, the inlet opening, the outlet opening and the cushioning conduit are formed in the body, the inlet opening is connected to the mixing valve to receive the combined fluid, the cushioning conduit comprises a closed end, an open end, a passage located between the closed end and the open end, and an annular wall extends from the closed end toward the open end, the passage is separated by the annular wall into a hollow passage and an annular passage surrounding the hollow passage, the annular wall has a length less than a length of the passage, so that the hollow passage and the annular passage are communicated with each other at the open end, and the solenoid valve is electrically connected to the sensor and movably disposed at a connecting port communicated between the hollow passage and the annular passage. The spout is fluidly connected to the outlet conduit of the control assembly through a connecting conduit to supply the combined fluid.

In summary, the structural design of the cushioning conduit makes a water flow changing its flowing direction when passing through the cushioning conduit, reduces an excessive water pressure caused by an initial flowing direction of the water flow, greatly improves the problem of excessive water pressure, and avoids water hammer due to excessive water pressure, thereby allowing users to wash more comfortably and conveniently.

In order to make the above-mentioned features and advantages of the invention more obvious and comprehensible, the following specific embodiments are described in detail in conjunction with the accompanying drawings.

DETAILED DESCRIPTION OF THE PREFERRED EMBODIMENTS

The terminology used herein is only for a purpose of describing specific embodiments and does not intend to limit the invention. Unless the context indicates otherwise, the singular forms "a", "an" and "the" used herein may also include plural forms.

The directional terms used herein, such as up, upward, down, downward, left, right, front, back, rear and their derivatives or synonyms, refer to the orientations and directions of the elements or components in the drawings and do not intend to limit the invention unless the context clearly describes otherwise.

Figure 1:
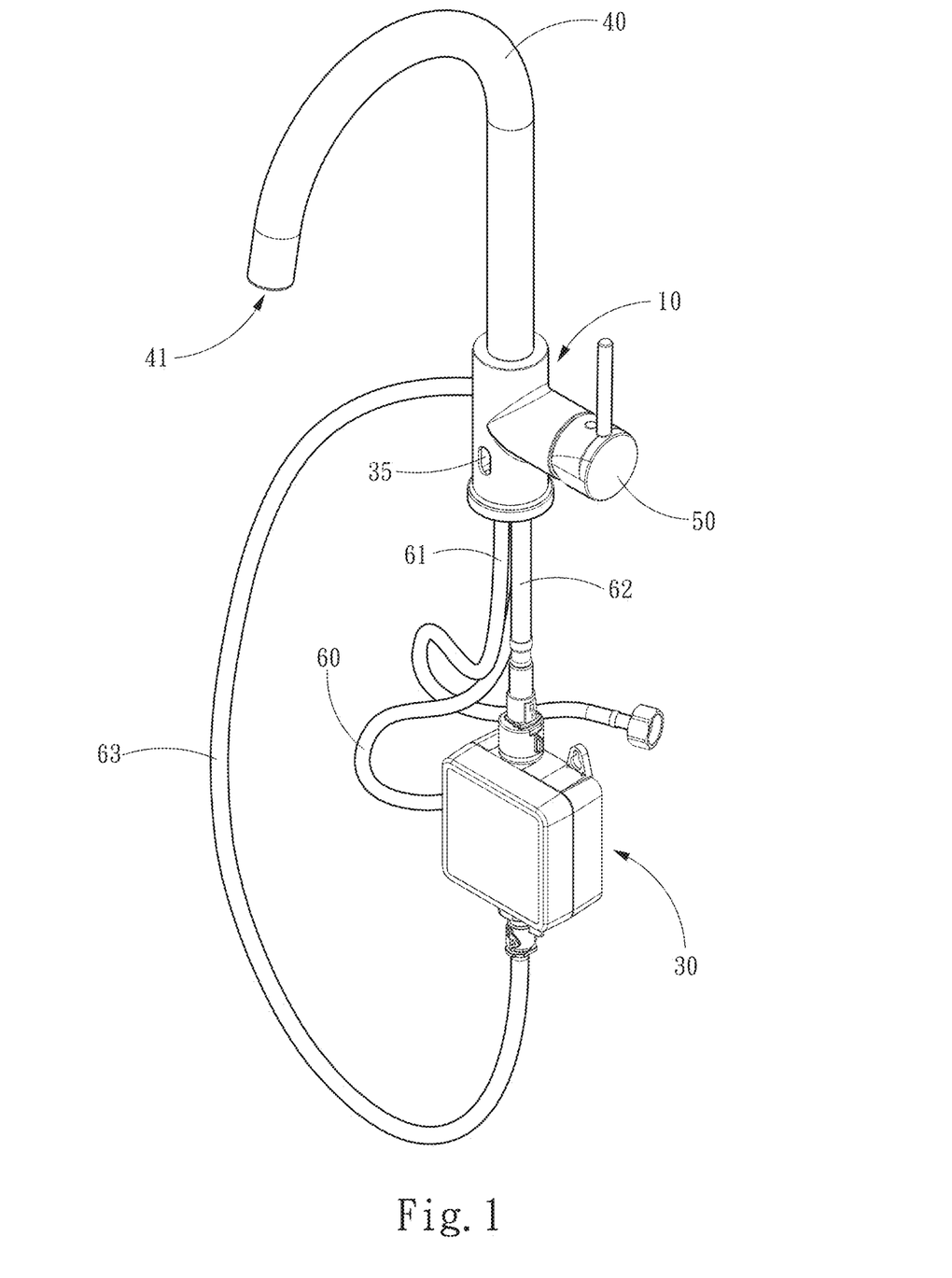
FIG. 1 is a perspective assembly view of an embodiment of the invention.
Figure 2:
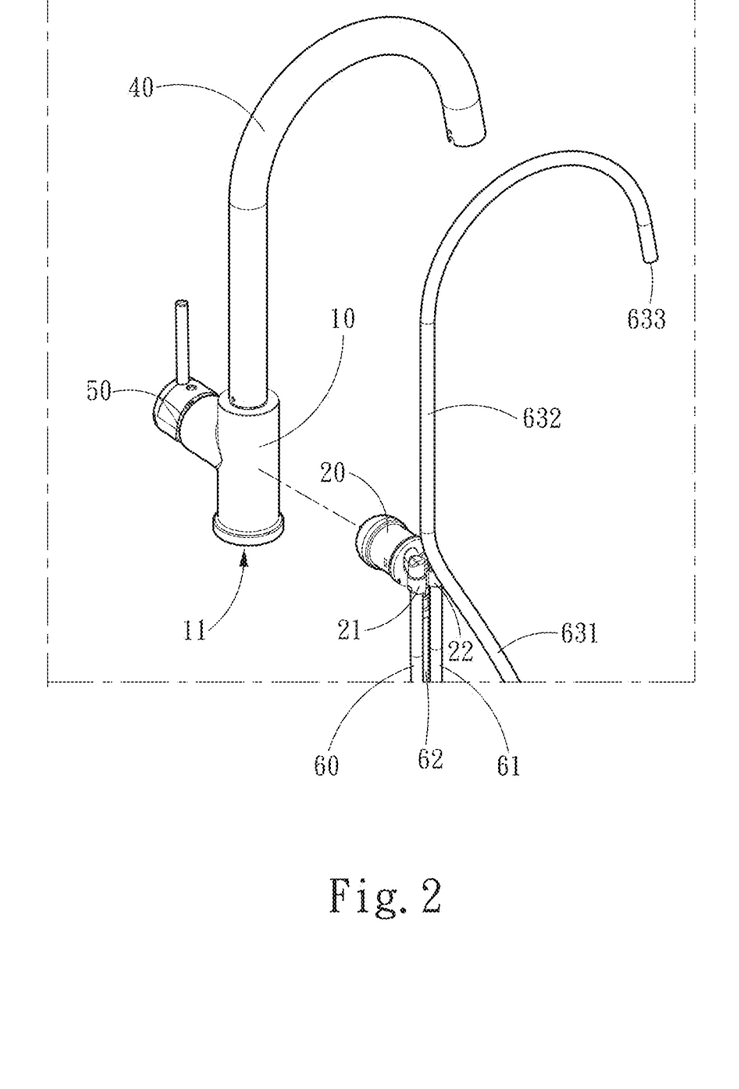
FIG. 2 is a partial exploded view of an embodiment of the invention.

Referring to FIG. 1 and FIG. 2, the invention discloses a sensor-operated kitchen faucet comprising a base 10, a mixing valve 20, a control assembly 30, a spout 40, and an adjustment handle 50. The base 10 is used for installing or fixing on a plane, such as a surface of a sink (not shown in the drawings). The base 10 extends vertically to define an inner space 11, the mixing valve 20 is disposed in the inner space 11, the control assembly 30 in this embodiment is disposed under the plane separately from the base 10, and the spout 40 is connected to the base 10 and has a nozzle 41.

The mixing valve 20 includes a cold water input end 21, a hot water input end 22, and an output end 23. The cold water input end 21 and the hot water input end 22 are respectively communicated to a cold source and a hot source via a cold water conduit 60 and a hot water conduit 61, the mixing valve 20 receives a cold water and a hot water from the cold source and the hot source to supply a combined fluid from the output end 23, the mixing valve 20 is operably coupled to the adjustment handle 50, and flow rate (or volume) of the cold water and the hot water entering the mixing valve 20 can be adjusted by swivel of the adjustment handle 50 to change a water temperature of the combined fluid. The combined fluid flows into the control assembly 30 from the output end 23 of the mixing valve 20 via an output conduit 62. The control assembly 30 is configured to be capable of controlling whether the combined fluid flows out or not. When the control assembly 30 is turned on, the combined fluid passes through the control assembly 30 and flows out from the spout 40 via a connecting conduit 63. The connecting conduit 63 comprises a first section 631 and a second section 632, the first section 631 is connected to the control assembly 30, the second section 632 extends from the first section 631 and is disposed in the spout 40, and the second section 632 has an outlet end 633 opposite to the first section 631.

Figure 3:
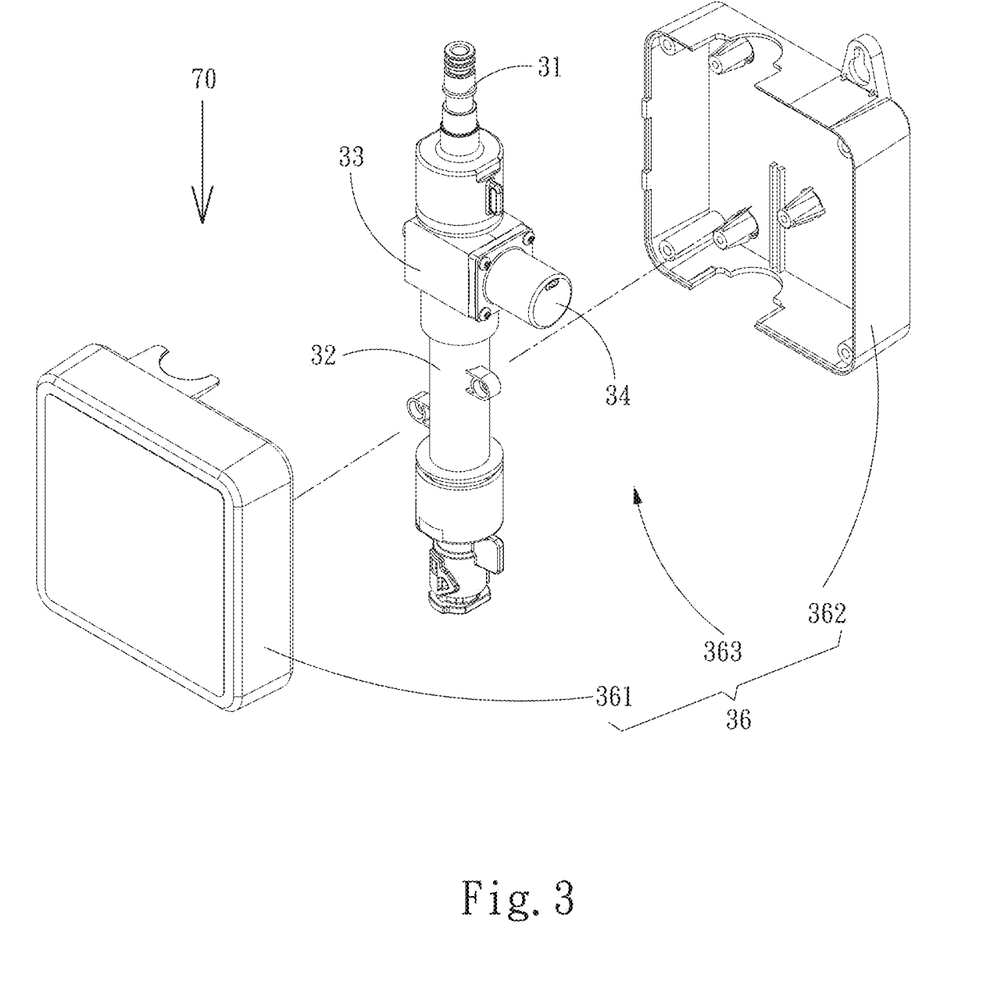
FIG. 3 is a perspective view of a control assembly of an embodiment of the invention.

Referring to FIG. 3, the control assembly 30 comprises a inlet conduit 31, a outlet conduit 32, a cushioning member 33, a solenoid valve 34, a sensor 35 (shown in FIG. 1) and a housing 36. The housing 36 comprises a housing cover 361, a housing seat 362, and an accommodating space 363 defined between the housing cover 361 and the housing seat 362. The inlet conduit 31, the outlet conduit 32, the cushioning member 33 and the solenoid valve 34 are installed in the accommodating space 363. The inlet conduit 31 and the outlet conduit 32 are respectively disposed at a top end and a bottom end of the cushioning member 33, the inlet conduit 31 and the outlet conduit 32 are configured at an interval along a first direction 70. Two ends of the inlet conduit 31 are respectively connected to the output conduit 62 (i.e. the output end 23 of the mixing valve 20) and the cushioning member 33 to receive and guide the combined fluid into the cushioning member 33, and two ends of the outlet conduit 32 are connected to the cushioning member 33 and the connecting conduit 63, respectively, so that the combined fluid flows out from the outlet end 633 via the connecting conduit 63. The solenoid valve 34 is electrically connected to the sensor 35, and the sensor 35 is fixed on an outer wall surface of the base 10 (as shown in FIG. 1). In one embodiment, the solenoid valve 34 and the sensor 35 can be further connected to a controller. The solenoid valve 34, the sensor 35 and the controller can be connected to an external power, the external power can be a battery pack or utility power.

Figure 4:
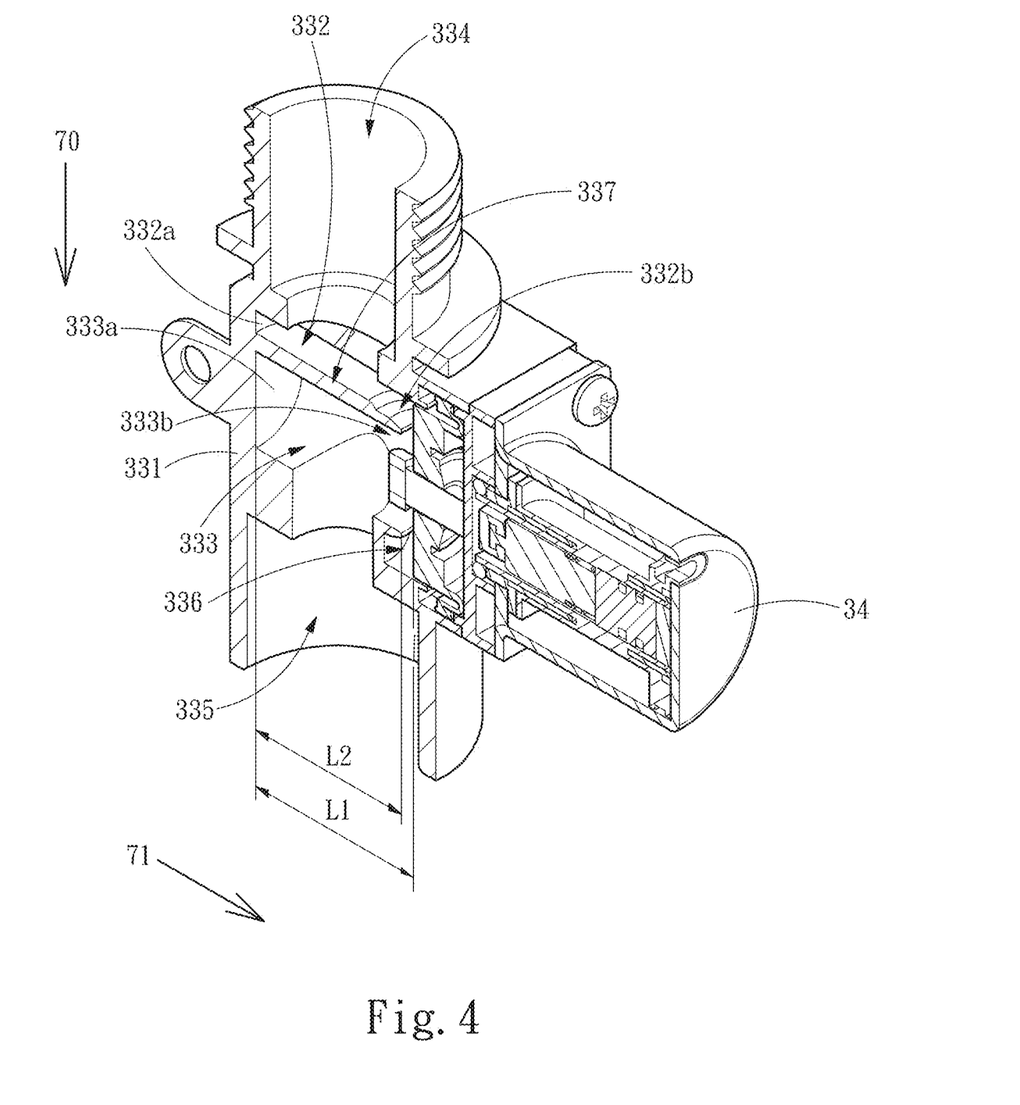
FIG. 4 is a perspective cross-sectional view of the control assembly along the XZ planes of an embodiment of the invention.
Figure 5:
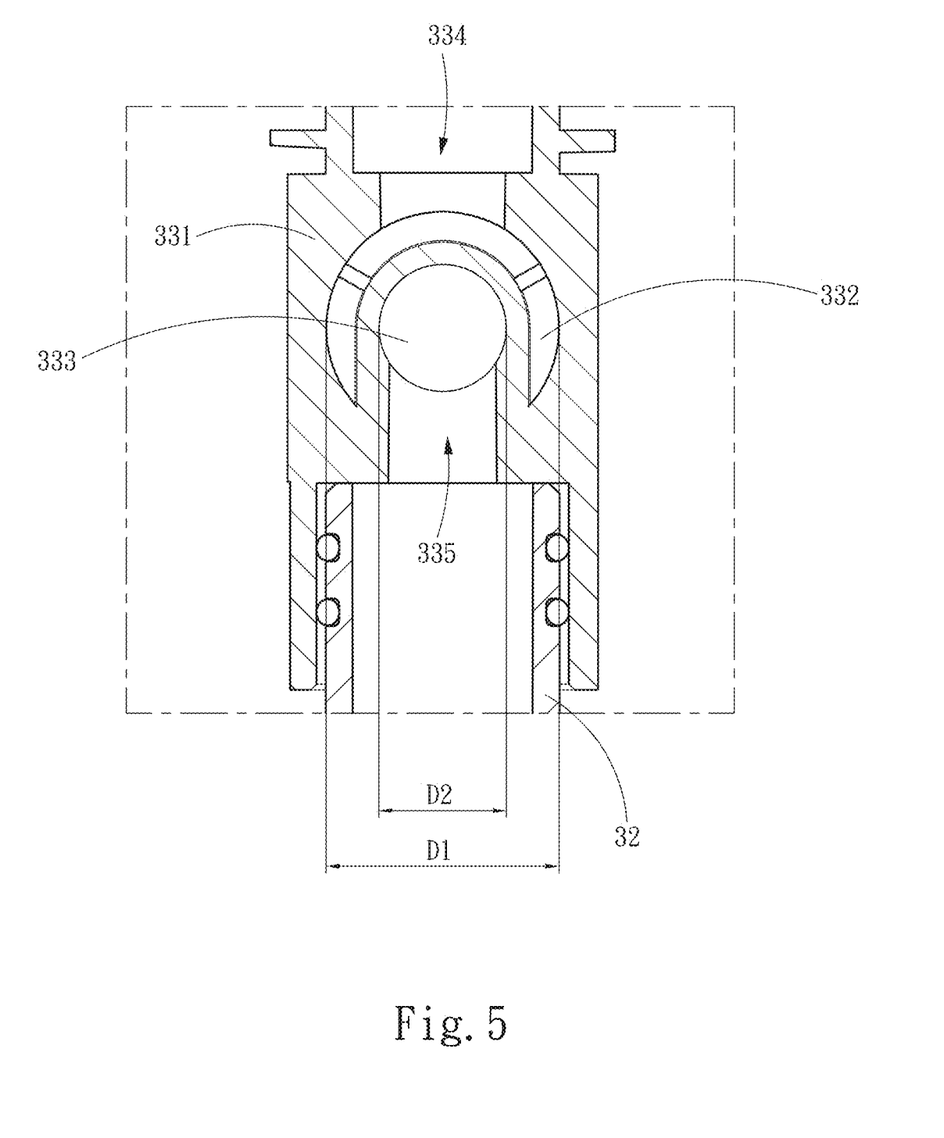
FIG. 5 is a cross-sectional view of the control assembly along the YZ planes of an embodiment of the invention.

Referring to FIG. 4 and FIG. 5, the cushioning member 33 comprises a body 331, an outer tubing 332, an inner tubing 333, an inlet opening 334, an outlet opening 335 and a connecting port 336. In this embodiment, the outer tubing 332 is a cylindrical annular passage, and the inner tubing 333 is a cylindrical hollow passage. The outer tubing 332 and the inner tubing 333 are concentrically disposed in the body 331 and extended along a second direction 71, and the outer tubing 332 surrounds the inner tubing 333. The outer tubing 332 is connected to the inlet opening 334 to communicate radially (or vertically when seen in the figure) to the water inlet conduit 31, and the inner tubing 333 is connected to the outlet opening 335 to communicate radially (or vertically when seen in the figure) to the water outlet conduit 32. The connecting port 336 is disposed between the outer tubing 332 and the inner tubing 333. The combined fluid flows into the cushioning member 33 from the water inlet conduit 31 then passes through the inlet opening 334, the outer tubing 332, the connecting port 336, and the outlet opening 335. Consequently, the combined fluid flows through the water outlet conduit 32 and finally flows out from the outlet end 633.

Further, the outer tubing 332 comprises a first closed end 332a and a first open end 332b, and the inner tubing 333 comprises a second closed end 333a and a second open end 333b. Preferably, the first closed end 332a and the second closed end 333a are in a same side (left side in FIG. 4). The inner tubing 333 has a second length L2 and a second outer diameter D2, the outer tubing 332 has a first length L1 and a first outer diameter D1, the first length L1 and the first outer diameter D1 are respectively greater than the second length L2 and the second outer diameter D2, thereby, there is a difference in length between the first open end 332b and the second open end 333b, so that the first open end 332b and the second open end 333b communicate with each other.

In one embodiment, the outer tubing 332 and the inner tubing 333 constitute a cushioning conduit in the body 331, the first closed end 332a and the first open end 332b constitute a closed end of the cushioning conduit, the first open end 332b and the second open end 333b constitute an open end of the cushioning conduit, a annular wall 337 of the cushioning conduit extends from the closed end to the open end, the hollow passage and the annular passage are respectively arranged on an inner side and an outer side of the annular passage, the hollow passage is separated by the annular wall 337, and the annular passage surrounds the annular wall 337 and the hollow passage. A length of the annular wall 337 is equal to the second length L2. After the combined fluid enters the annular passage of the cushioning conduit via the inlet opening 334, a flow direction of the combined fluid is changed (from the first direction 70 to the second direction 71) and a flow rate of the combined fluid is reduced due to the cushioning conduit, the flow direction of the combined fluid is changed (from the second direction 71 to the first direction 70, and then to a direction opposite to the second direction 71) again while flowing toward the connecting port 336, and subsequently the combined fluid flows into the hollow passage, the flow direction of the combined fluid is changed again and the flow rate of the combined fluid is reduced by the closed end, the combined fluid then flows out through the outlet opening 335 (from the direction opposite to the second direction 71 changing to the first direction 70). By arrangement of the inlet conduit 31, the outlet conduit 32, the cushioning member 33 and the solenoid valve 34, a pressure of water after flowing through the control assembly 30 can be more balanced.

In this embodiment, the inlet opening 334 and the outlet opening 335 are arranged in parallel along the first direction 70. In other embodiments, the inlet opening 334 is arranged along the first direction 70, and the outlet opening 335 can be arranged along a third direction, that is, the inlet opening 334 and the outlet opening 335 can be arranged non-parallelly. An angle between the first direction 70 and the third direction may be in a range less than 15 degrees, an angle between the first direction 70 and the second direction 72 may be in a range of 75 degrees and 90 degrees, and an angle between the second direction 72 and the third direction may be in a range of 75 degrees and 90 degrees.

Figure 6:
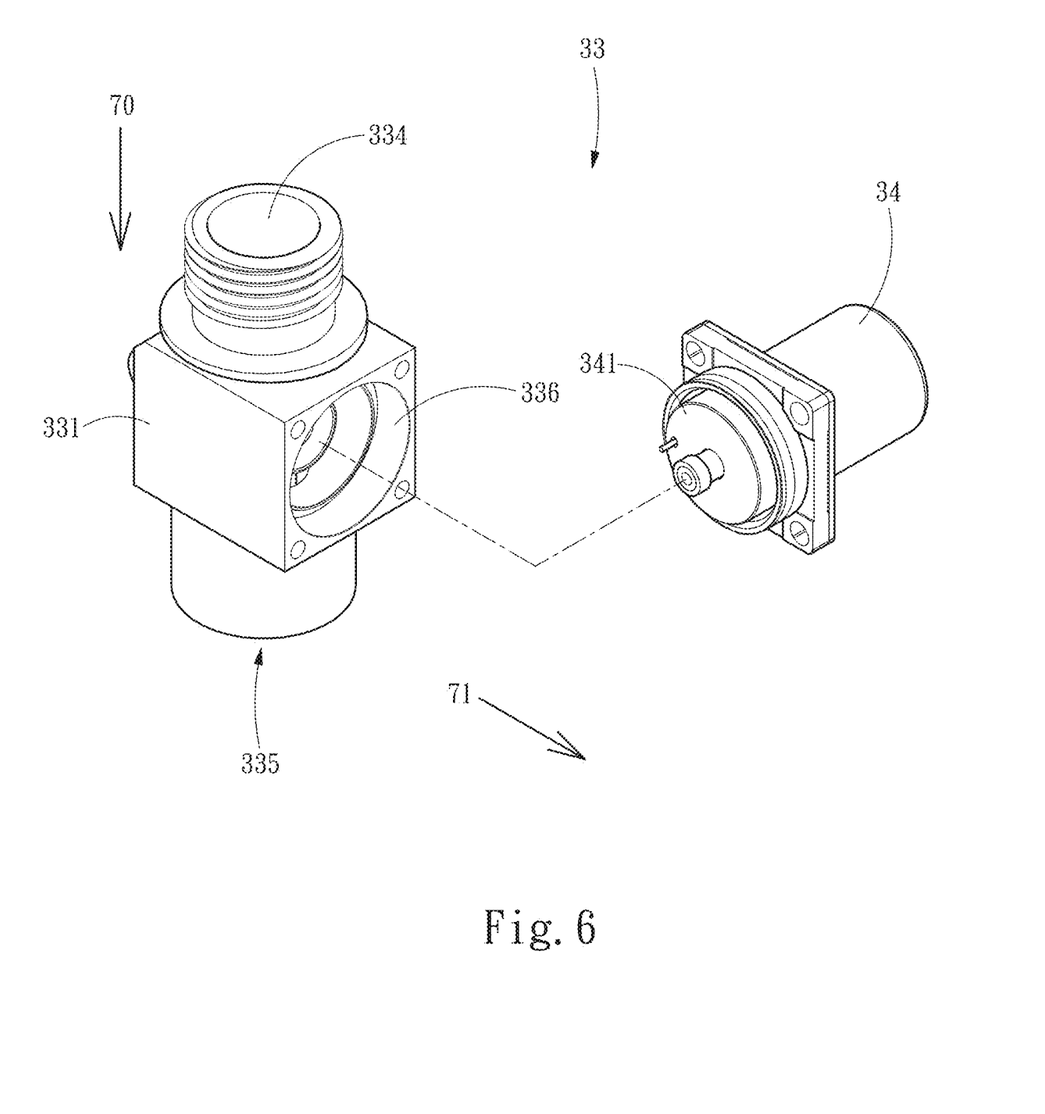
FIG. 6 is an exploded view of the control assembly of an embodiment of the invention.
Figure 7A:
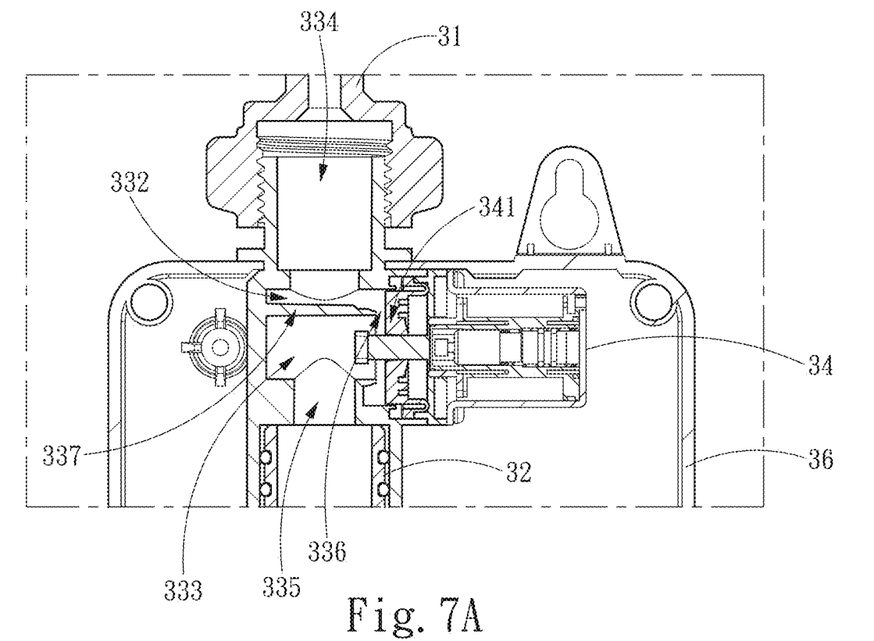
FIG. 7A and FIG. 7B are cross-sectional views of a sealing member respectively in an open position and a closed position in an embodiment of the invention.
Figure 7B:
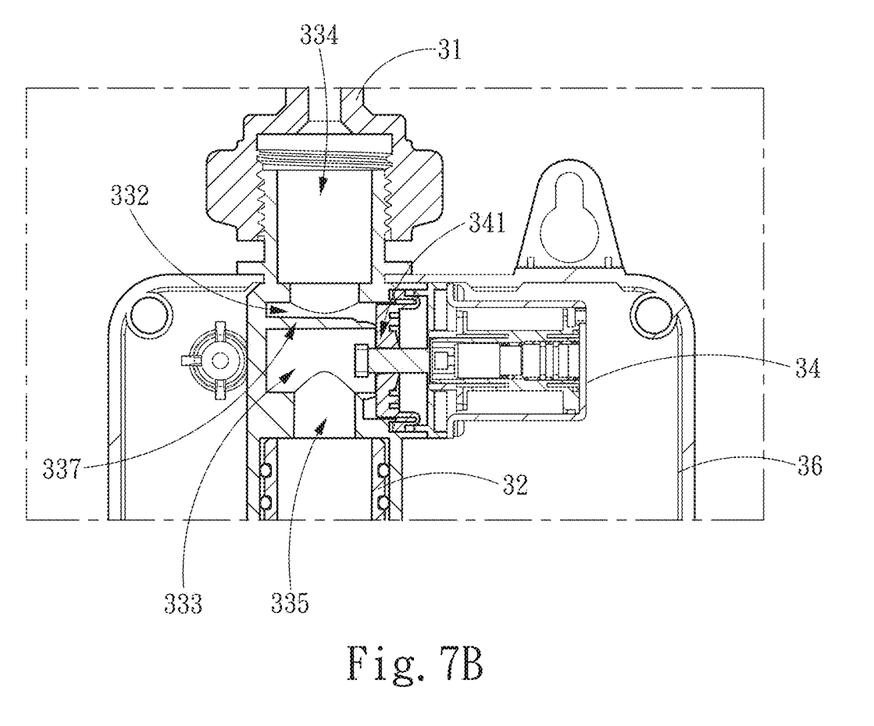

Referring to FIG. 6, FIG. 7A and FIG. 7B, the solenoid valve 34 is electrically connected to the sensor 35 and is movably disposed at the connecting port 336. The solenoid valve 34 comprises a sealing member 341, the sensor 35 is configured to control the sealing member 341 moving between an open position (as shown in FIG. 7A) and a closed position (as shown in FIG. 7B). In this embodiment, the sealing member 341 is in the shape of a disc, corresponding to the annular connecting port 336, and a movement of the sealing member 341 is coaxial with the outer tubing 332 and the inner tubing 333. Further, when the solenoid valve 34 is in the open position, the sealing member 341 is distant from the connecting port 336 by the difference in length between the first open end 332b and the second open end 333b. When the solenoid valve 34 is in the closed position, the sealing member 341 of the solenoid valve 34 abuts against the connecting port 336.

The sensor 35 is capable of detecting approaching objects (for example, a user who desires to use the sensor-operated kitchen faucet). When the sensor 35 does not detect the approaching objects, the sensor 35 is in an inactive state, the sensor 35 controls the sealing member 341 to be in the closed position at the time, thereby closing a flow of the combined fluid. When the sensor 35 detects the approaching objects, the sensor 35 is in an activated state, the sensor 35 controls the sealing member 341 to be in the open position to allow the combined fluid flowing out at the time. Thereby, through arrangement of the sensor 35, water outlet of the sensor-operated kitchen faucet can be controlled through proximity of an object. The sensor 35 can be implemented by an infrared (IR for short) sensor, for example.

In application, the user swivels the adjustment handle 50 to adjust a ratio of the cold water and the hot water entering the mixing valve 20 to change a water temperature of the combined fluid. In this embodiment, the user can swivel the adjustment handle 50 to adjust the water temperature, and the controls whether the solenoid valve 34 to be opened or closed by approaching or leaving away from the sensor 35, thereby controlling the combined fluid whether enters the hollow passage from the annular passage. The sealing member 341 of the solenoid valve 34 is normally closed, when the user approaches the sensor 35 to activate the solenoid valve 34, the sealing member 341 of the solenoid valve 34 moves to allow the annular passage communicating with the hollow passage, so that the combined fluid flows out from the spout 40 after passing through the outlet opening 335 and the outlet conduit 32.

Figure 8:
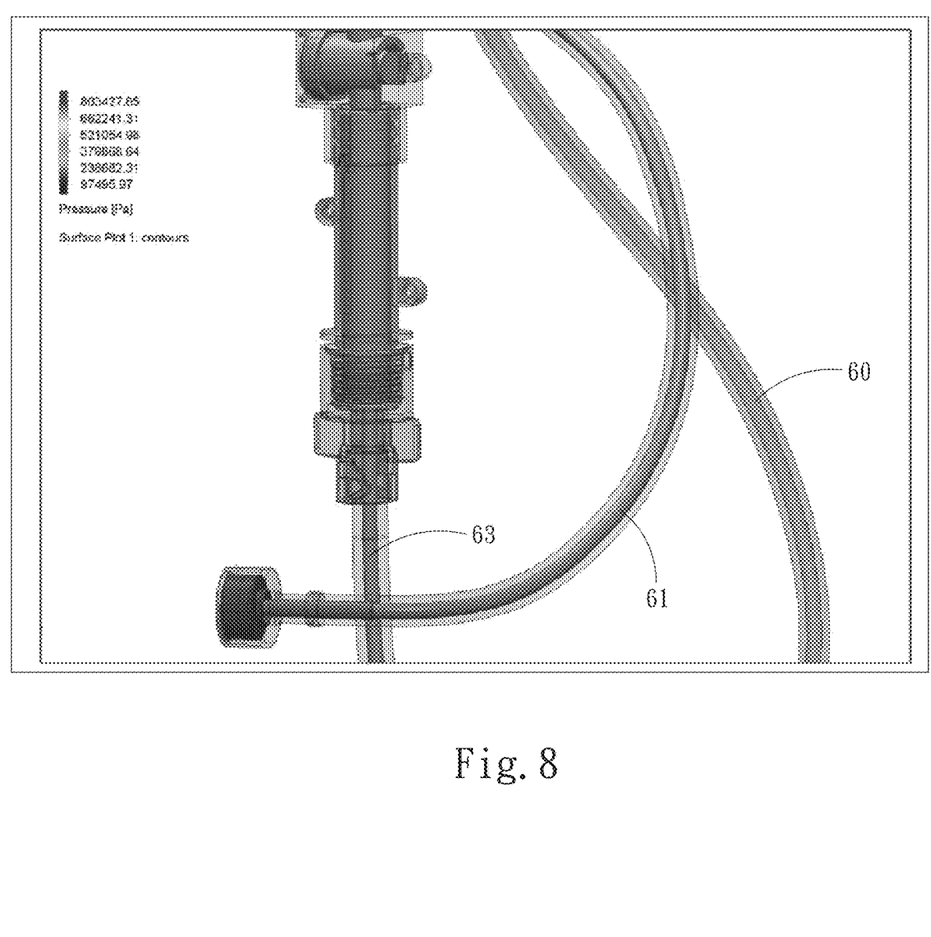
FIG. 8 is a schematic diagram of water pressure simulation in an embodiment of the invention.

Referring to FIG. 8 for a schematic diagram of water pressure simulation in an embodiment of the invention. In operation, water pressures of the cold water and the hot water entering a faucet are different. The cold water with a lower water pressure and the hot water with a higher water pressure are used for an explanation as follows. As shown in FIG. 8, it can be seen that a water pressure of the water supplied from the connecting conduit through the control assembly is relatively moderate and stable.

In summary, instead of a combined fluid of conventional mechanical faucets directly flowing into the outlet conduit, the combined fluid of the invention flows from the inlet conduit into the annular passage of the cushioning conduit by arrangement of the closed end, the open end, the annular wall, the hollow passage, and the annular passage. The flow direction of the combined fluid of the invention is changed while flowing into the annular passage and being blocked by the annular wall, and flows toward the sealing member of the solenoid valve. When the sealing member is in the open position, the combined fluid flows into the hollow passage to the outlet conduit through the outlet opening, and passes through the connecting conduit communicating to the spout. In this way, the cushioning conduit of the cushioning member exerts a function of reduce pressure of a water flow, thereby effectively controlling the influence that external water pressure changes on the outlet conduit, so that the user is subjected to the water flow with moderate.

What is claimed is:
1. A sensor-operated kitchen faucet, comprising:
  a base extending vertically to define an inner space;
  a mixing valve, disposed in the inner space and connect to a cold source and a hot source to supply a combined fluid, wherein the mixing valve is operably coupled to an adjustment handle;

a control assembly, comprising a cushioning member, a solenoid valve and a sensor, wherein the cushioning member comprises a body, an inlet opening, an outlet opening, and a cushioning conduit communicated between the inlet opening and the outlet opening, the inlet opening, the outlet opening and the cushioning conduit are formed in the body, the inlet opening is connected to the mixing valve to receive the combined fluid, the cushioning conduit comprising a hollow passage and an annular passage surrounding the hollow passage, the solenoid valve is electrically connected to the sensor and movably disposed at a connecting port communicated between the hollow passage and the annular passage;

wherein, the inlet opening, the cushioning conduit, and the outlet opening are configured to extend along a first direction, a second direction, and a third direction, respectively, an angle defined between the first direction and the second direction is set in a range of 75 degrees and 90 degrees, an angle defined between the first direction and the third direction is set in a range less than 15 degrees, and an angle defined between the second direction and the third direction is set in a range of 75 degrees and 90 degrees; and a spout, fluidly connected to the outlet opening of the control assembly through a connecting conduit to supply the combined fluid.

2. The sensor-operated kitchen faucet according to claim 1, wherein the annular passage comprises a first closed end and a first open end, the hollow passage comprises a second closed end and a second open end, and a difference in length is formed between the first open end and the second open end, so that the first open end and the second open end communicate with each other.

3. The sensor-operated kitchen faucet according to claim 1, wherein the control assembly further comprises a housing accommodating the cushioning member and the solenoid valve.

4. The sensor-operated kitchen faucet according to claim 1, wherein the sensor is fixed on an outer wall surface of the base.

5. A sensor-operated kitchen faucet comprising:
a base extending vertically to define an inner space;
a mixing valve, disposed in the inner space and connected to a cold source and a hot source to supply a combined fluid, wherein the mixing valve is operably coupled to an adjustment handle;
a control assembly, comprising a cushioning member, a solenoid valve and a sensor, wherein the cushioning member comprises a body, an inlet opening, an outlet opening, and a cushioning conduit communicated between the inlet opening and the outlet opening, the inlet opening, the outlet opening and the cushioning conduit are formed in the body, the inlet opening is communicated to the mixing valve to receive the combined fluid, the cushioning conduit comprises a closed end, an open end, a passage located between the closed end and the open end, and a annular wall extending from the closed end toward the open end, the passage is separated by the annular wall into a hollow passage and an annular passage surrounding the hollow passage, a length the annular wall is less than a length of the passage, so that the hollow passage and the annular passage communicating with each other at the open end, the solenoid valve is electrically connected to the sensor and movably disposed at a connecting port communicated between the hollow passage and the annular passage; and
a spout, fluidly connected to the outlet opening of the control assembly through a connecting conduit to supply the combined fluid;
wherein the inlet opening, the cushioning conduit, and the outlet opening are configured to extend along a first direction, a second direction, and a third direction, respectively, wherein an angle defined between the first direction and the second direction is set in a range of 75 degrees and 90 degrees, an angle defined between the first direction and the third direction is set in a range less than 15 degrees, and an angle defined between the second direction and the third direction is set in a range of 75 degrees and 90 degrees.

6. The sensor-operated kitchen faucet according to claim 5, wherein the control assembly further comprises a housing accommodating the cushioning member and the solenoid valve.

7. The sensor-operated kitchen faucet according to claim 5, wherein the sensor is fixed on an outer wall surface of the base.

* * * * *